United States Patent
Watanabe et al.

(10) Patent No.: US 12,552,450 B2
(45) Date of Patent: Feb. 17, 2026

(54) STEERING SYSTEM FOR VEHICLE

(71) Applicants: HONDA MOTOR CO., LTD., Tokyo (JP); THYSSENKRUPP PRESTA AKTIENGESELLSCHAFT, Eschen (LI)

(72) Inventors: Yoshinobu Watanabe, Tokyo (JP); Isao Obata, Saitama (JP); Levente Pasztor, Budapest (HU); Krisztian Domotor, Zalaegerszeg (HU); Zoltan Szander, Tarnok (HU); Daniel Gyorgy, Budapest (HU); Peter Kakas, Budapest (HU)

(73) Assignees: HONDA MOTOR CO., LTD., Tokyo (JP); THYSSENKRUPP PRESTA AKTIENGESELLSCHAFT, Eschen (LI)

( * ) Notice: Subject to any disclaimer, the term of this patent is extended or adjusted under 35 U.S.C. 154(b) by 127 days.

(21) Appl. No.: 18/578,650

(22) PCT Filed: Jul. 14, 2021

(86) PCT No.: PCT/JP2021/026525
§ 371 (c)(1),
(2) Date: Jan. 11, 2024

(87) PCT Pub. No.: WO2023/286223
PCT Pub. Date: Jan. 19, 2023

(65) Prior Publication Data
US 2024/0391523 A1    Nov. 28, 2024

(51) Int. Cl.
*B62D 6/00* (2006.01)

(52) U.S. Cl.
CPC .................................. *B62D 6/002* (2013.01)

(58) Field of Classification Search
None
See application file for complete search history.

(56) References Cited

U.S. PATENT DOCUMENTS 7,092,805 B2 *  8/2006  Kasahara ............... B62D 5/006
                                                701/41
8,175,772 B2 *  5/2012  Onuma .................. B62D 6/007
                                                701/41

(Continued)

FOREIGN PATENT DOCUMENTS

CN    114348112 A  *  4/2022
CN    114348112 B  *  11/2022

(Continued)

OTHER PUBLICATIONS

International Search Report and Written Opinion for Japanese Patent Application PCT/JP2021/026525 mailed Mar. 25, 2022; 10 pp.

(Continued)

*Primary Examiner* — Kevin R Steckbauer
(74) *Attorney, Agent, or Firm* — Armstrong Teasdale LLP

(57) ABSTRACT

The steering system for the vehicle includes: a steering mechanism mechanically separated from a steering member and configured to steer wheels by moving a rack; a steering actuator configured to apply a driving force to the steering mechanism; and a controller configured to calculate a target position of the rack and to control the steering actuator such that a position of the rack matches the target position thereof. The controller is configured to execute target position correction control in which the controller corrects the target position of the rack according to a steering angular velocity and/or a steering angular acceleration of the steering member.

9 Claims, 10 Drawing Sheets

(56) References Cited

U.S. PATENT DOCUMENTS

| | | | |
|---|---|---|---|
| 9,499,193 B2 | 11/2016 | Kageyama et al. | |
| 9,994,249 B2 | 6/2018 | Kageyama et al. | |
| 11,479,293 B2* | 10/2022 | Narasimhan | B62D 5/0484 |
| 2006/0080016 A1* | 4/2006 | Kasahara | B62D 6/008 |
| | | | 701/41 |
| 2009/0312909 A1* | 12/2009 | Onuma | B62D 6/008 |
| | | | 701/41 |
| 2018/0086371 A1 | 3/2018 | Wang et al. | |
| 2022/0289278 A1* | 9/2022 | Narasimhan | B62D 6/008 |
| 2024/0391523 A1* | 11/2024 | Watanabe | B62D 6/002 |

FOREIGN PATENT DOCUMENTS

| | | | | |
|---|---|---|---|---|
| CN | 116873034 A | * | 10/2023 | B62D 5/0463 |
| CN | 117651674 A | * | 3/2024 | B62D 6/002 |
| CN | 120080908 A | * | 6/2025 | B62D 5/046 |
| DE | 102017207229 A1 | * | 10/2018 | B62D 5/0457 |
| DE | 112021007983 T5 | * | 5/2024 | B62D 6/002 |
| DE | 102023108287 A1 | * | 10/2024 | B62D 6/002 |
| FR | 2908377 A1 | * | 5/2008 | B62D 6/007 |
| JP | 2002225733 A | | 8/2002 | |
| JP | 2006111099 A | | 4/2006 | |
| JP | 2008087533 A | | 4/2008 | |
| JP | 2013107615 A | | 6/2013 | |
| JP | 2024514013 A | * | 3/2024 | B62D 6/002 |
| JP | 7636584 B2 | * | 2/2025 | B62D 6/002 |
| WO | WO-2008038117 A2 | * | 4/2008 | B62D 6/007 |
| WO | 2012073469 A1 | | 6/2012 | |
| WO | WO-2023286223 A1 | * | 1/2023 | B62D 6/002 |
| WO | WO-2024199568 A1 | * | 10/2024 | B62D 6/002 |

OTHER PUBLICATIONS

Notice of Reasons for Refusal for Japanese Patent Application No. 2023-563895 dated Nov. 5, 2024; 10 pp.

* cited by examiner

STEERING SYSTEM FOR VEHICLE

CROSS-REFERENCE TO RELATED APPLICATIONS

This application is a U.S. national stage application of PCT/JP2021/026525 filed on Jul. 14, 2021 which is hereby expressly incorporated by reference in its entirety.

TECHNICAL FIELD

The present invention relates to a steering system for a vehicle.

BACKGROUND ART

Conventionally, there is a steer-by-wire steering system including a steering member configured to receive a steering operation and a steering mechanism mechanically separated from the steering member and configured to steer wheels by moving a rack.

For example, Patent Literature 1 discloses a steering system for a vehicle including a steering mechanism configured to change the direction of steerable wheels and a steering means supported by a static member without being mechanically connected to the steering mechanism.

CITATION LIST

Patent Literature

[Patent Literature 1] JP2002-225733A

SUMMARY OF INVENTION

Technical Problem

In a steering system in which the steering member and the steering mechanism are mechanically connected, the torque generated by the steering operation is transmitted to the rack of the steering mechanism via a shaft of the steering member. At this time, the shaft of the steering member is twisted, so that the movement of the rack is delayed with respect to the steering operation. By contrast, in a steer-by-wire steering system, the torque generated by the steering operation is transmitted to the rack of the steering mechanism via an electric signal. Accordingly, the movement of the rack is less likely to be delayed with respect to the steering operation as compared with the steering system in which the steering member and the steering mechanism are mechanically connected.

However, if the movement of the rack is too responsive to the steering operation, the wheels may be rapidly steered immediately after a quick steering operation by a driver, which may cause the discomfort of the driver.

In view of the above background, an object of the present invention is to provide a steering system for a vehicle that can suppress the discomfort of the driver in a case where the driver performs a quick steering operation.

Solution of Problem

To achieve such an object, one aspect of the present invention provides a steering system (1) for a vehicle (2), including: a steering member (10) configured to receive a steering operation; a steering angle sensor (32) configured to detect a steering angle of the steering member; a steering mechanism (11) mechanically separated from the steering member and configured to steer wheels (3) by moving a rack (26); a steering actuator (12) configured to apply a driving force to the steering mechanism; a rack position sensor (33) configured to detect a position of the rack; and a controller (15) configured to calculate a target position of the rack based on the steering angle of the steering member and to control the steering actuator such that the position of the rack detected by the rack position sensor matches the target position of the rack, wherein the controller is configured to execute target position correction control in which the controller corrects the target position of the rack according to a steering angular velocity and/or a steering angular acceleration of the steering member to delay a movement of the rack in response to a change in the steering angle of the steering member.

According to this aspect, in a case where the steering angular velocity and/or the steering angular acceleration of the steering member increase according to a quick steering operation by a driver, the target position of the rack is corrected, so that the movement of the rack in response to the change in the steering angle of the steering member can be delayed. Accordingly, it is possible to prevent the wheels from being rapidly steered immediately after the quick steering operation, so that the discomfort of the driver can be suppressed.

In the above aspect, preferably, in the target position correction control, the controller corrects the target position of the rack immediately after a start of the steering operation in a prescribed direction.

In general, the steering angular velocity and/or the steering angular acceleration of the steering member are likely to increase immediately after the start of the steering operation in the prescribed direction. Considering such likelihood, the target position of the rack is corrected immediately after the start of the steering operation in the prescribed direction. Accordingly, it is possible to surely prevent the wheels from being rapidly steered immediately after the quick steering operation, so that the discomfort of the driver can be suppressed effectively.

In the above aspect, preferably, the steering operation includes a turning operation as an operation in a direction away from a prescribed neutral position and a returning operation as an operation in a direction of the neutral position, and in the target position correction control, the controller corrects the target position of the rack immediately after a start of the returning operation.

In general, the driver is more likely to be careless and thus the steering angular velocity and/or the steering angular acceleration of the steering member are more likely to increase excessively during the performance of the returning operation than during the performance of the turning operation. Considering such likelihood, the target position of the rack is corrected immediately after the start of the returning operation. Accordingly, it is possible to prevent the wheels from being rapidly steered immediately after an excessively quick steering operation, so that the discomfort of the driver can be suppressed effectively.

In the above aspect, preferably, in the target position correction control, the controller prohibits correction of the target position of the rack during performance of the turning operation.

In general, the driver is more likely to be careful and thus the steering angular velocity and/or the steering angular acceleration of the steering member are more unlikely to increase excessively during the performance of the turning operation than during the performance of the returning operation. Considering such unlikelihood, the correction of the target position of the rack is prohibited during the performance of the turning operation, so that the responsiveness of the movement of the rack to the steering operation can be prevented from being unnecessarily deteriorated.

In the above aspect, preferably, in the target position correction control, the controller calculates the target position of the rack according to the steering angle of the steering member, calculates a correction amount of the target position of the rack according to the steering angular acceleration of the steering member, and corrects the target position of the rack by adding the correction amount to the target position of the rack.

According to this aspect, by calculating the correction amount according to the steering angular acceleration of the steering member, it is possible to calculate an appropriate correction amount according to a change in the steering angular velocity of the steering member.

In the above aspect, preferably, the controller calculates the correction amount such that the correction amount increases as the steering angular acceleration of the steering member increases.

According to this aspect, the correction amount increases as the quickness of the steering operation increases, so that the delay in the movement of the rack can also increase. Accordingly, it is possible to surely prevent the wheels from being rapidly steered immediately after the quick steering operation, so that the discomfort of the driver can be suppressed effectively.

In the above aspect, preferably, the controller limits the correction amount to a prescribed upper limit or less.

If the correction amount increases indefinitely, the delay in the movement of the rack may become excessively large, and it may become impossible to determine whether the delay in the movement of the rack is caused by the target position correction control or an abnormality of the steering system. By contrast, if the correction amount is limited to the upper limit or less, it can be easily determined that the steering system is abnormal as soon as the correction amount exceeds the upper limit. Accordingly, it is unnecessary to require excessively high reliability of the components (sensors, or the like) of the steering system.

In the above aspect, preferably, the steering member is configured to be steered in a direction away from a prescribed neutral position or in a direction of the neutral position, and the controller is configured to set the upper limit based on a steering direction of the steering member, the steering angle of the steering member, and a vehicle speed.

According to this aspect, the upper limit can be set to an appropriate value according to the traveling state of the vehicle.

In the above aspect, preferably, the controller is configured to switch between a non-execution mode in which the controller does not execute the target position correction control in response to the steering operation and an execution mode in which the controller executes the target position correction control in response to the steering operation.

According to this aspect, it is possible to determine whether to execute the target position correction control in response to the steering operation depending on the preference of the driver, the traveling state of the vehicle, or the like. Accordingly, the convenience of the steering system is improved.

In the above aspect, preferably, the controller is configured to execute the target position correction control in response to every steering operation.

According to this aspect, since the wheels can be surely prevented from being rapidly steered immediately after the quick steering operation, so that the discomfort of the driver can be suppressed more surely.

Advantageous Effects of Invention

Thus, according to the above aspects, it is possible to suppress the discomfort of the driver in a case where the driver performs a quick steering operation.

DESCRIPTION OF EMBODIMENTS

Figure 1:
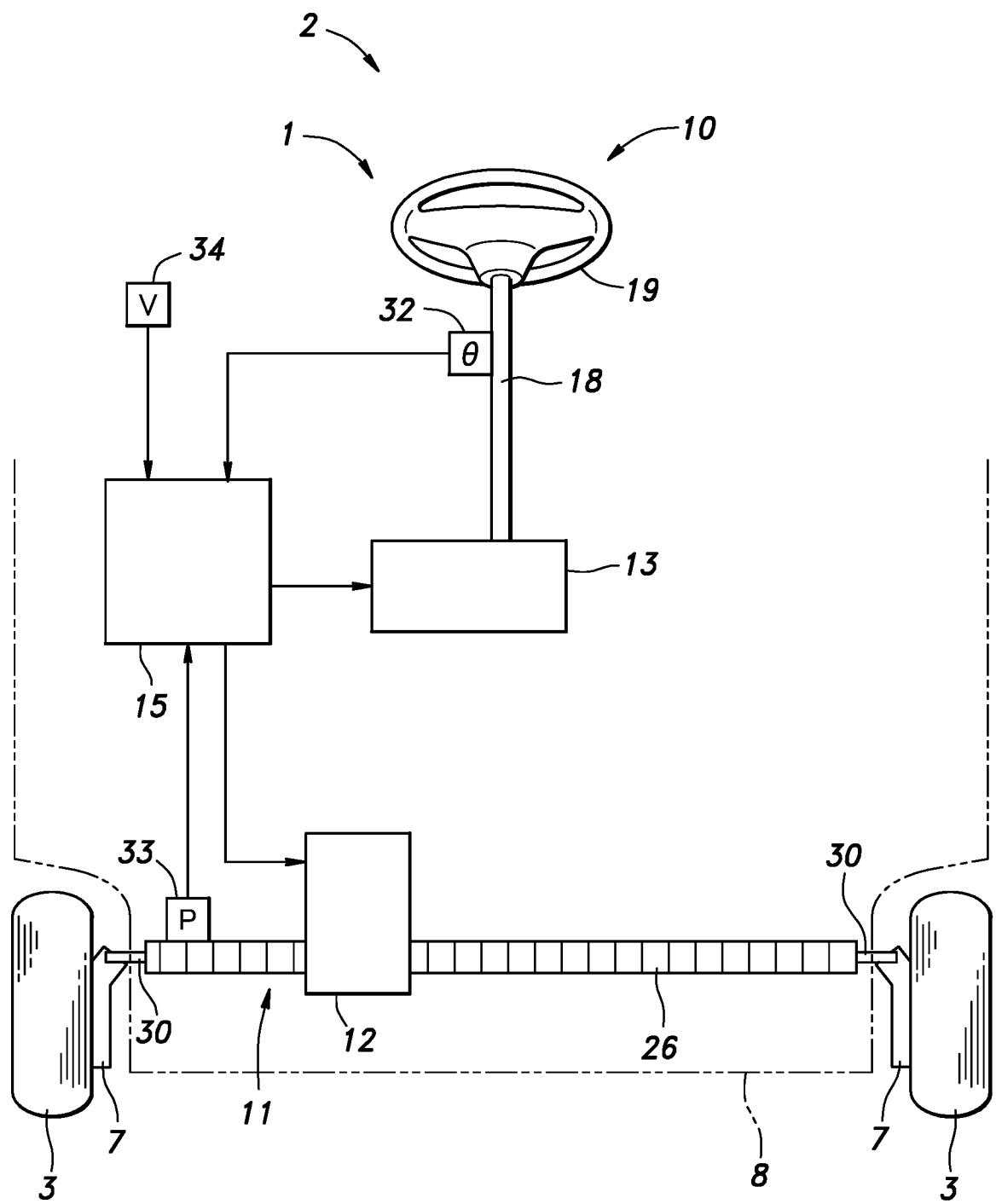
FIG. 1 a schematic diagram showing a steering system according to an embodiment of the present invention FIG. 2 a block diagram showing a steering controller according to the embodiment of the present invention FIG. 3 a schematic diagram showing a correction amount calculation map according to the embodiment of the present invention FIG. 4 a graph showing a relationship between a steering angle and a rack position in a case where a steering operation is performed in a non-execution mode according to the embodiment of the present invention FIG. 5 a graph showing a relationship between the steering angle and the rack position in a case where a normal operation is performed in an execution mode according to the embodiment of the present invention FIG. 6 a graph showing a relationship between the steering angle and the rack position in a case where a quick operation is performed in the execution mode according to the embodiment of the present invention FIG. 7 a graph showing a relationship between the steering angle and the rack position in a case where a further quick operation is performed in the execution mode according to the embodiment of the present invention FIG. 8 a graph showing a relationship between the steering angle and a steering angular acceleration during performance of a turning operation according to the embodiment of the present invention FIG. 9 a graph showing a relationship between the steering angle and the steering angular acceleration during performance of a returning operation according to the embodiment of the present invention FIG. 10 a schematic diagram showing a steering model according to another embodiment of the present invention

In the following, a steering system 1 for a vehicle 2 according to an embodiment of the present invention will be described. As shown in FIG. 1, the steering system 1 consists of a steer-by-wire (SBW) steering system. The vehicle 2 provided with the steering system 1 is a four-wheeled vehicle including left and right front wheels 3 and left and right rear wheels (not shown in the drawings). The left and right front wheels 3 are supported by a vehicle body 8 (only the outline of a lower part thereof is shown in FIG. 1) via respective knuckles 7 so that the turning angle of the front wheels 3 can be changed, and the front wheels 3 thus serve as steerable wheels. The turning angle refers to the angle of the front wheels 3 with respect to the front-and-rear direction in a plan view. The steering system 1 thus changes the turning angle of the front wheels 3.

The steering system 1 includes a steering member 10 rotatably provided on the vehicle body 8, a steering mechanism 11 configured to steer the front wheels 3, a steering actuator 12 configured to apply a driving force to the steering mechanism 11, a reaction force actuator 13 configured to apply a reaction torque to the steering member 10, and a steering controller 15 configured to control the reaction force actuator 13 and the steering actuator 12. The steering system 1 may be a redundant system that includes a plurality of steering actuators 12, a plurality of reaction force actuators 13, and a plurality of steering controllers 15.

The steering member 10 is configured to receive a steering operation by a driver. The steering member 10 includes a steering shaft 18 rotatably supported by the vehicle body 8 and a steering wheel 19 provided at an end of the steering shaft 18. The steering shaft 18 is rotatably supported by a steering column (not shown in the drawings) provided on the vehicle body 8, and has a rear end projecting rearward from the steering column. The steering wheel 19 is connected to the rear end of the steering shaft 18 so as to rotate integrally with the steering shaft 18.

The reaction force actuator 13 consists of an electric motor, and is connected to the steering shaft 18 via a gear mechanism. When the reaction force actuator 13 is driven, the driving force thereof is transmitted to the steering shaft 18 as a rotational force. The reaction force actuator 13 is configured to rotate and thus to apply torque to the steering member 10. The torque the reaction force actuator 13 applies to the steering member 10 in response to the steering operation is called "reaction torque".

The steering mechanism 11 includes a rack 26 extending in the vehicle width direction. The rack 26 is supported by a gear housing (not shown in the drawings) such that the rack 26 is movable in the vehicle width direction. The left and right ends of the rack 26 are connected to knuckles 7 that respectively support the left and right front wheels 3 via tie rods 30. As the rack 26 moves in the vehicle width direction from a prescribed reference position (a position where the direction of the left and right front wheels 3 are parallel to the front-and-rear direction: see FIG. 1), the turning angle of the front wheels 3 changes. The steering mechanism 11 is mechanically separated from the steering member 10.

The steering actuator 12 consists of an electric motor. The steering actuator 12 moves the rack 26 in the vehicle width direction based on a signal from the steering controller 15, thereby changing the turning angle of the left and right front wheels 3.

The steering controller 15 consists of an electronic control unit (ECU) including a CPU, a storage unit, and the like. The CPU is configured to control each part of the steering system 1 based on the program and data stored in the storage unit.

The steering controller 15 is connected to a steering angle sensor 32. The steering angle sensor 32 is configured to detect a rotation angle (hereinafter referred to as "the steering angle $\theta$") of the steering member 10 with respect to a prescribed neutral position and to output the steering angle $\theta$ to the steering controller 15. In the present embodiment, the steering angle $\theta$ is 0 when the steering member 10 is in the neutral position, the steering angle $\theta$ increases from 0 as the steering member 10 is steered to the right from the neutral position, and the steering angle $\theta$ decreases from 0 as the steering member 10 is steered to the left from the neutral position. However, in another embodiment, the steering angle $\theta$ may increase from 0 as the steering member 10 is steered to the left from the neutral position, and the steering angle $\theta$ may decrease from 0 as the steering member 10 is steered to the right from the neutral position.

The steering controller 15 is connected to a rack position sensor 33. The rack position sensor 33 is configured to detect a position (hereinafter referred to as "the rack position P") of the rack 26 in the vehicle width direction and to output the rack position P to the steering controller 15.

The steering controller 15 is connected to a vehicle speed sensor 34. The vehicle speed sensor 34 is configured to detect a speed (hereinafter referred to as "the vehicle speed V") of the vehicle 2 and to output the vehicle speed V to the steering controller 15.

(Target Position Correction Control)

The steering controller 15 is configured to execute target position correction control in which the steering controller 15 corrects a target position T1 of the rack 26 according to a steering angular acceleration. For example, the target position correction control is periodically executed in a state where an ignition switch of the vehicle 2 is turned on (in a state where the steering system 1 is in operation). In the following, the target position correction control in a case where the steering angle $\theta$ is larger than 0 (namely, in a case where the steering member 10 is steered to the right from the neutral position) will be described, and the description of the target position correction control in a case where the steering angle $\theta$ is smaller than 0 (namely, in a case where the steering member 10 is steered to the left from the neutral position) will be omitted.

Figure 2:
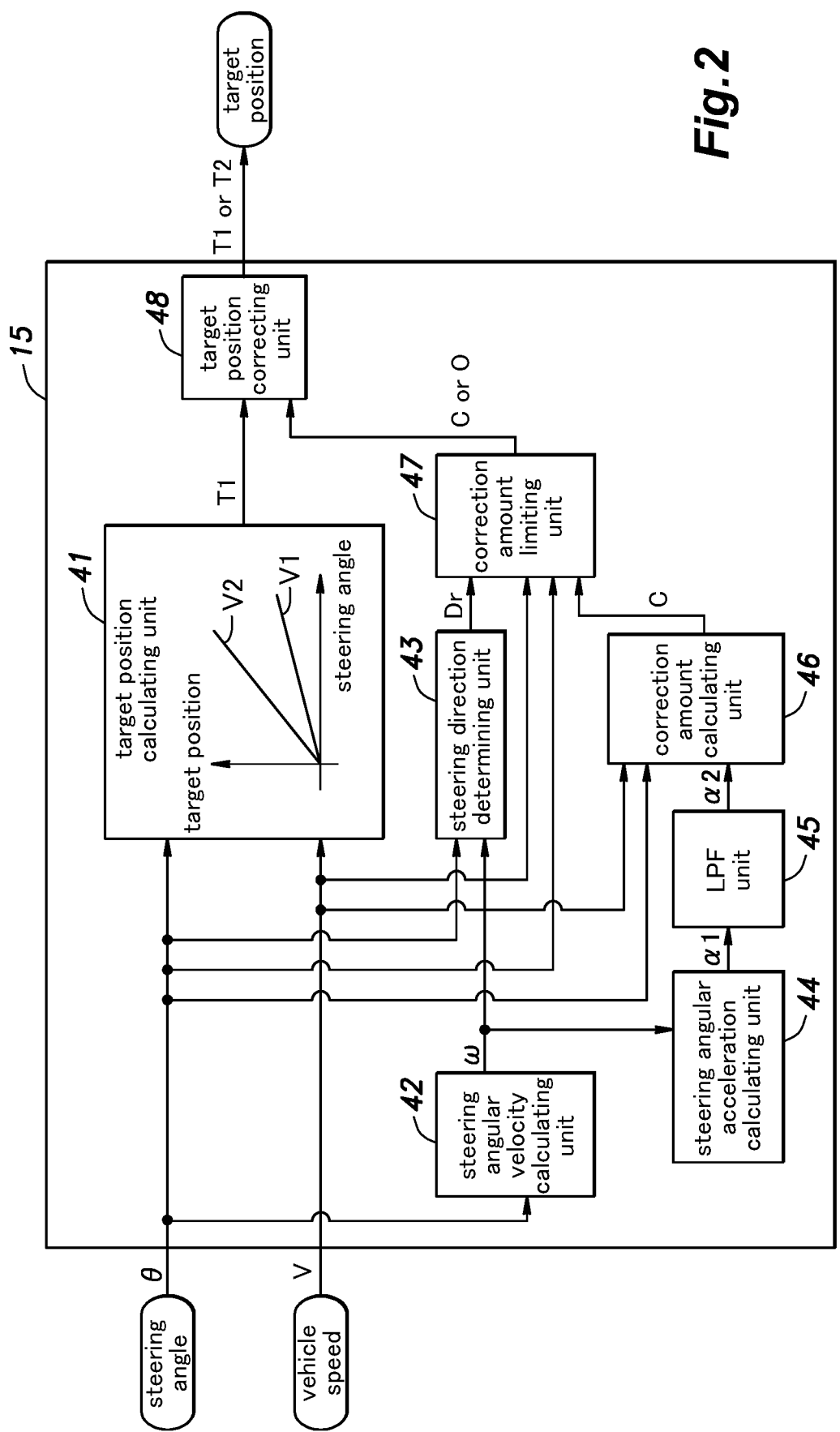

With reference to FIG. 2, the steering controller 15 includes a target position calculating unit 41, a steering angular velocity calculating unit 42, a steering direction determining unit 43, a steering angular acceleration calculating unit 44, a low-pass filter unit (LPF unit) 45, a correction amount calculating unit 46, a correction amount limiting unit 47, and a target position correcting unit 48, which are functional elements for executing the target position correction control.

The target position calculating unit 41 of the steering controller 15 calculates a target position T1 of the rack 26 based on the steering angle $\theta$ and the vehicle speed V (V1, V2, . . . ). More specifically, the target position calculating unit 41 calculates the target position T1 by multiplying the steering angle $\theta$ by a reference gear ratio corresponding to the vehicle speed V. For example, the reference gear ratio is set to decrease as the vehicle speed V increases.

The steering angular velocity calculating unit 42 of the steering controller 15 calculates a steering angular velocity $\omega$ by differentiating the steering angle $\theta$ with respect to time. Incidentally, the steering angular velocity calculating unit 42 may apply a low-pass filter process to the calculated steering angular velocity $\omega$, thereby removing noise (more specifically, noise generated by a differential calculation) in the steering angular velocity $\omega$.

The steering direction determining unit 43 of the steering controller 15 determines the direction (hereinafter referred to as "the steering direction Dr") of the steering operation based on the steering angle $\theta$ and the steering angular velocity $\omega$.

For example, in a case where the steering angle $\theta$ is larger than 0 and the steering angular velocity $\omega$ is larger than 0, it can be estimated that the steering member 10 is on the right side of the neutral position and that the steering member 10 is being steered from the left side to the right side. In such a case, the steering direction determining unit 43 determines that the steering direction Dr is a direction away from the neutral position. In the following, the steering operation in the direction away from the neutral position is referred to as "the turning operation".

For example, in a case where the steering angle $\theta$ is larger than 0 and the steering angular velocity $\omega$ is smaller than 0, it can be estimated that the steering member 10 is on the right side of the neutral position and that the steering member 10 is being steered from the right side to the left side. In such a case, the steering controller 15 determines that the steering direction Dr is a direction of the neutral position. In the following, the steering operation in the direction of the neutral position is referred to as "the returning operation".

The steering angular acceleration calculating unit 44 of the steering controller 15 calculates a steering angular acceleration α1 by differentiating the steering angular velocity ω with respect to time.

The LPF unit 45 of the steering controller 15 applies a low-pass filter process to the steering angular acceleration α1, thereby removing noise (more specifically, noise generated by a differential calculation) in the steering angular acceleration α1. Thereby, the LPF unit 45 generates a steering angular acceleration α2 from which the noise is removed.

Figure 3:
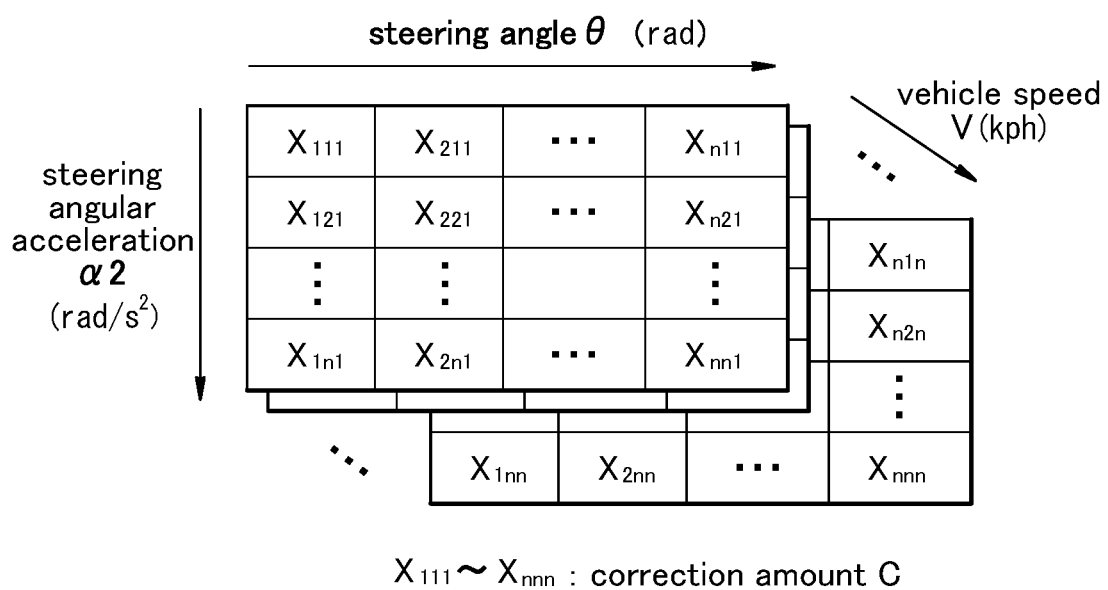

The correction amount calculating unit 46 of the steering controller 15 calculates a correction amount C of the target position T1 based on the steering angle θ, the steering angular acceleration α2, and the vehicle speed V. For example, the correction amount calculating unit 46 calculates the correction amount C by referring to a correction amount calculation map (see FIG. 3) based on the steering angle θ, the steering angular acceleration α2, and the vehicle speed V. The correction amount calculation map is a three-dimensional control map that defines the relationship of the steering angle θ, the steering angular acceleration α2, and the vehicle speed V with the correction amount C. In the correction amount calculation map, if the steering angular acceleration α2 is 0, the corresponding correction amount C is set to 0. By contrast, in the correction amount calculation map, if the steering angular acceleration α2 is not 0, the corresponding correction amount C is set to a value larger than 0 according to the steering angular acceleration α2. For example, in the correction amount calculation map, the correction amount C increases as the steering angular acceleration α2 increases.

The correction amount limiting unit 47 of the steering controller 15 sets an upper limit Lim based on the steering direction Dr, the steering angle θ, and the vehicle speed V. For example, in a case where the steering direction Dr is the direction away from the neutral position (namely, in a case where the steering operation is the turning operation), the correction amount limiting unit 47 sets the upper limit Lim to 0. Further, in a case where the steering angle θ is less than a prescribed reference angle θr, the correction amount limiting unit 47 sets the upper limit Lim to 0. By contrast, in a case where the steering direction Dr is a direction of the neutral position (namely, the steering operation is the returning operation) and the steering angle θ is equal to or more than the reference angle θr, the correction amount limiting unit 47 sets the upper limit Lim (Lim>0) according to the vehicle speed V.

The correction amount limiting unit 47 of the steering controller 15 compares the correction amount C with the upper limit Lim. In a case where the correction amount C is equal to or less than the upper limit Lim, the correction amount limiting unit 47 outputs the correction amount C as it is. On the other hand, in a case where the correction amount C exceeds the upper limit Lim, the correction amount limiting unit 47 outputs the correction amount C after reducing the correction amount C to the upper limit Lim. In this way, the correction amount limiting unit 47 limits the correction amount C to the upper limit Lim or less. Incidentally, in a case where 0 is set to the upper limit Lim as described above (namely, in a case where the steering operation is the turning operation or in a case where the steering angle θ is less than the reference angle θr), the correction amount limiting unit 47 outputs 0 instead of the correction amount C.

The target position correcting unit 48 of the steering controller 15 determines whether 0 or the correction amount C is output from the correction amount limiting unit 47. In a case where 0 is output from the correction amount limiting unit 47, the target position correcting unit 48 outputs the target position T1 as it is without correcting the target position T1. By contrast, in a case where the correction amount C is output from the correction amount limiting unit 47, the target position correcting unit 48 corrects the target position T1 by adding the correction amount C to the target position T1, and thus outputs a corrected target position T2. Thereby, the target position correction control is completed.

(Execution Mode and Non-Execution Mode)

The steering controller 15 is configured to switch between a non-execution mode in which the steering controller 15 does not execute the target position correction control in response to the steering operation and an execution mode in which the steering controller 15 executes the target position correction control in response to the steering operation. For example, the steering controller 15 may switch between the non-execution mode and the execution mode according to an operation by the driver or a traveling state of the vehicle 2.

Figure 4:
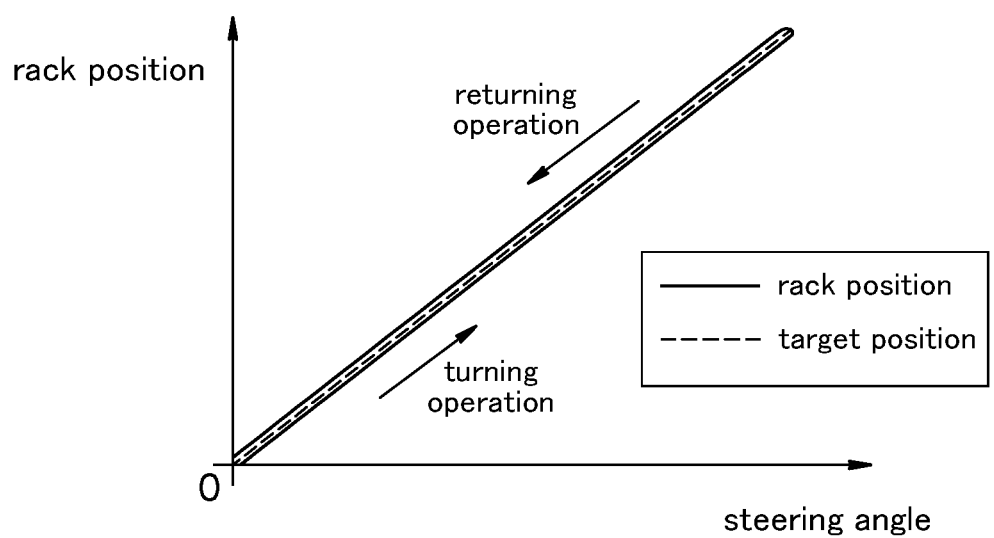

FIG. 4 shows a relationship between the steering angle θ and the rack position P in a case where the steering operation is performed in the non-execution mode. During the non-execution mode, the steering controller 15 controls the steering actuator 12 such that the rack position P matches the target position T1. Practically, the rack position P is slightly delayed with respect to the target position T1 according to the delayed time from the output of the target position T1 to the movement of the rack 26.

Figure 5:
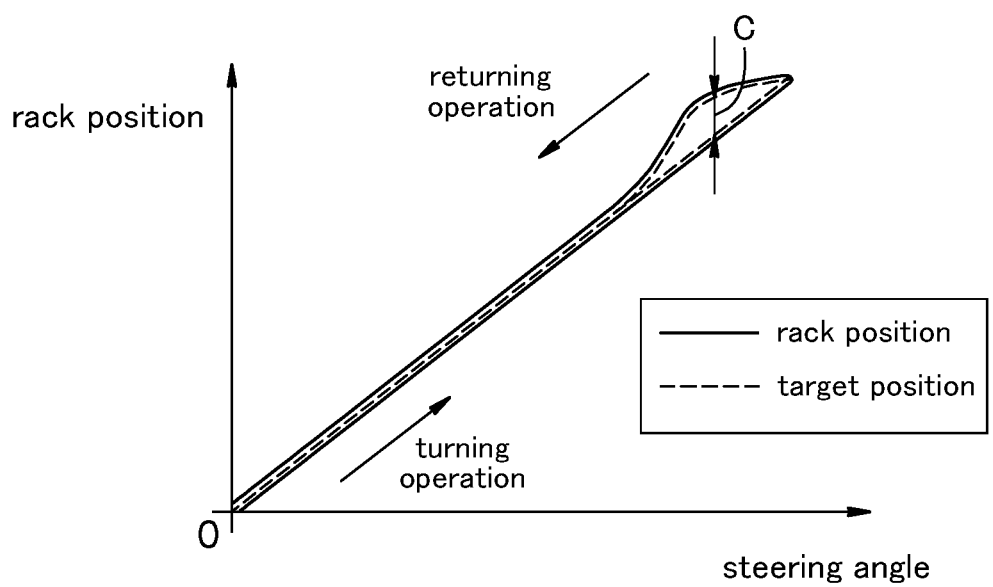
Figure 6:
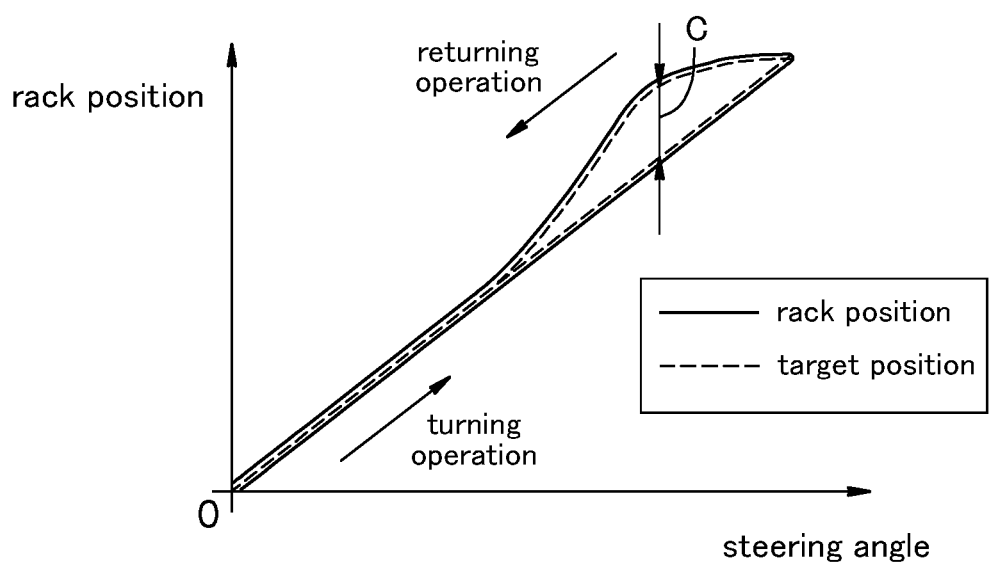
Figure 7:
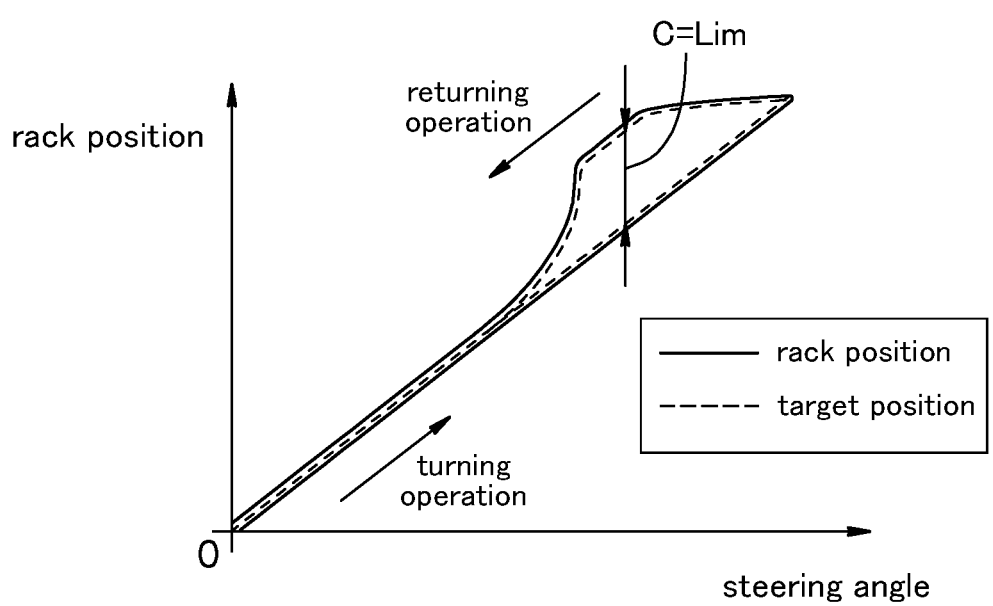

FIGS. 5, 6, and 7 show relationships between the steering angle θ and the rack position P in a case where a normal operation, a quick operation, and a further quick operation are performed in the execution mode, respectively. During the execution mode, the steering controller 15 controls the steering actuator 12 such that the rack position P matches the target position T1 or T2. Practically, the rack position P is slightly delayed with respect to the target position T1 or T2 according to the delayed time from the output of the target position T1 or T2 to the movement of the rack 26.

Figure 8:
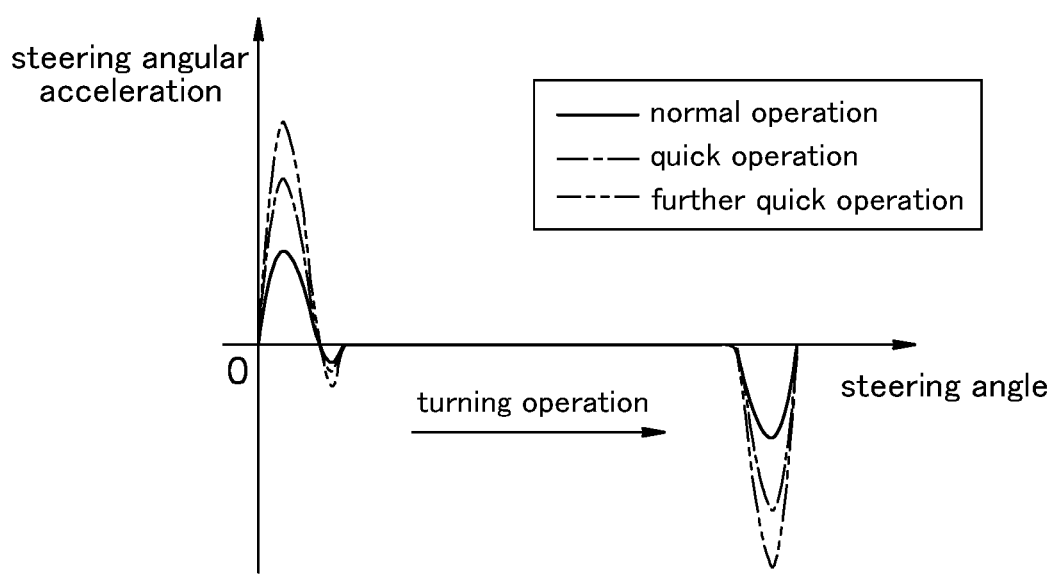

With reference to FIG. 8, when the turning operation is performed in the execution mode, the steering angular acceleration is generated according to the quickness of the turning operation immediately after the start of the turning operation and immediately before the end of the turning operation. Accordingly, the correction amount calculating unit 46 calculates the correction amount C according to the steering angular acceleration, and outputs the correction amount C to the correction amount limiting unit 47. As described above, in a case where the steering operation is the turning operation, the correction amount limiting unit 47 outputs 0 instead of the correction amount C. In a case where 0 is output from the correction amount limiting unit 47, the target position correcting unit 48 outputs the target position T1 as it is without correcting the target position T1.

As described above, even if the turning operation is performed in the execution mode, the target position T1 is not corrected. Accordingly, regarding the turning operation, the rack position P in the execution mode (see FIGS. 5 to 7) matches the rack position P in the non-execution mode (see FIG. 4).

Figure 9:
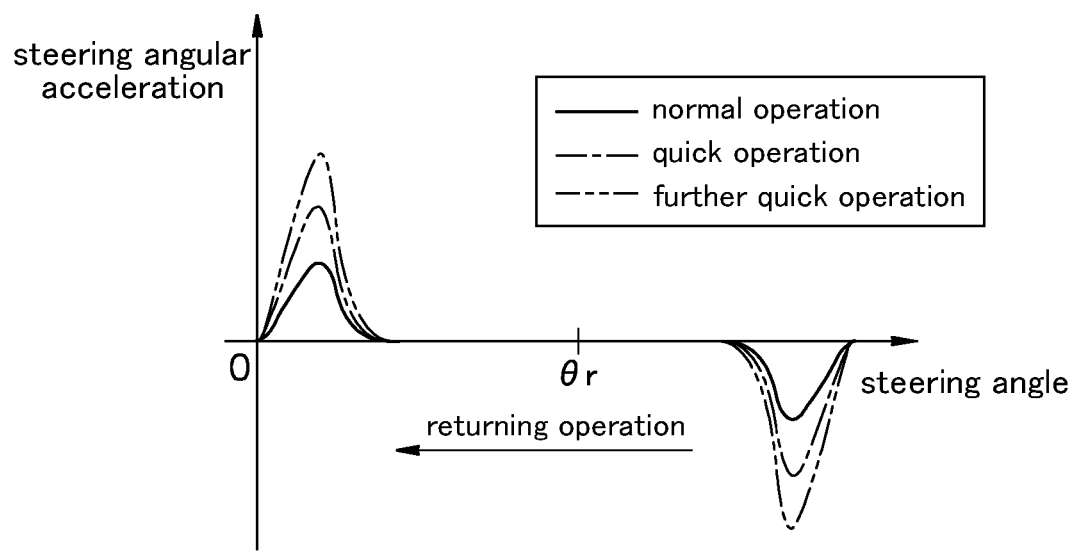

With reference to FIG. 9, when the returning operation is performed in the execution mode, the steering angular acceleration is generated according to the quickness of the returning operation immediately after the start of the returning operation and immediately before the end of the returning operation. Accordingly, the correction amount calculating unit 46 calculates the correction amount C according to the steering angular acceleration, and outputs the correction amount C to the correction amount limiting unit 47.

Immediately after the start of the returning operation, the steering angle θ is equal to or more than the reference angle θr. Accordingly, the correction amount limiting unit 47 outputs the correction amount C as it is in a case where the correction amount C is equal to or less than the upper limit Lim, and the correction amount limiting unit 47 outputs the correction amount C after reducing the correction amount C to the upper limit Lim in a case where the correction amount C exceeds the upper limit Lim. In a case where the correction amount C is output from the correction amount limiting unit 47, the target position correcting unit 48 corrects the target position T1 by adding the correction amount C to the target position T1, and outputs the corrected target position T2.

Immediately before the end of the returning operation, the steering angle θ is less than the reference angle θr. As described above, in a case where the steering angle θ is less than the reference angle θr, the correction amount limiting unit 47 outputs 0 instead of the correction amount C. In a case where 0 is output from the correction amount limiting unit 47, the target position correcting unit 48 outputs the target position T1 as it is without correcting the target position T1.

As described above, when the returning operation is performed in the execution mode, the target position T1 is corrected immediately after the start of the returning operation. Accordingly, regarding the returning operation, the trajectory of the rack position P in the execution mode (see FIGS. 5 to 7) is shifted from the trajectory of the rack position P in the non-execution mode (see FIG. 4). Accordingly, the movement of the rack 26 in the execution mode is delayed with respect to the movement of the rack 26 in the non-execution mode.

Immediately after the start of the returning operation in the execution mode, the correction amount C of the target position T1 increases as the quickness of the steering operation increases (see FIGS. 5 to 7). However, in a case where the correction amount C of the target position T1 exceeds the upper limit Lim, the correction amount C of the target position T1 is limited to the upper limit Lim or less (see FIG. 7).

By the way, the steering operation may be switched from the returning operation to the turning operation while the target position T1 of the rack 26 is being corrected (namely, when the correction amount C is not 0). In such a case, it is preferable to gradually decrease the correction amount C to 0 while moving the rack 26, rather than to immediately decrease the correct amount C to 0 or to decrease the correct amount C without moving the rack 26. The way how the correction amount C gradually decreases in such a case may be analogous with the way how the correction amount C gradually increases immediately after the start of the returning operation. The decreasing rate of the correction amount C may be a function of the intensity (quickness) of the steering operation. For example, the quicker the steering operation is, the greater the decreasing rate of the correction amount C becomes.

Further, a gain of the turning operation may be distinguished from a gain of the returning operation. Also, the upper limit Lim may be suddenly changed in a state where the correction amount C reaches the upper limit Lim. In these cases, it is preferable to limit the changing rate of the correction amount C to a prescribed rate or less.

Effect

As described above, the steering controller 15 executes the target position correction control in which the steering controller 15 corrects the target position T1 of the rack 26 according to the steering angular acceleration. Thus, in a case where the steering angular acceleration increases according to the quick steering operation by the driver, the target position T1 of the rack 26 is corrected, so that the movement of the rack 26 in response to the change in the steering angle θ can be delayed. Accordingly, it is possible to prevent the front wheels 3 from being rapidly steered immediately after the quick steering operation, so that the discomfort of the driver can be suppressed.

In general, the steering angular velocity and/or the steering angular acceleration of the steering member 10 are likely to increase immediately after the start of the steering operation in a prescribed direction. Considering such likelihood, in the target position correction control, the steering controller 15 corrects the target position T1 of the rack 26 immediately after the start of the steering operation in the prescribed direction. Accordingly, it is possible to surely prevent the front wheels 3 from being rapidly steered immediately after the quick steering operation, so that the discomfort of the driver can be suppressed effectively.

In general, the driver is more likely to be careless and thus the steering angular velocity and/or the steering angular acceleration of the steering member 10 are more likely to increase excessively during the performance of the returning operation than during the performance of the turning operation. Considering such likelihood, in the target position correction control, the steering controller 15 corrects the target position T1 of the rack 26 immediately after the start of the returning operation. Accordingly, it is possible to prevent the front wheels 3 from being rapidly steered immediately after an excessively quick steering operation, so that the discomfort of the driver can be suppressed effectively.

In general, the driver is more likely to be careful and thus the steering angular velocity and/or the steering angular acceleration of the steering member 10 are more unlikely to increase excessively during the performance of the turning operation than during the performance of the returning operation. Considering such unlikelihood, in the target position correction control, the steering controller 15 prohibits the correction of the target position T1 of the rack 26 during the performance of the turning operation. Accordingly, the responsiveness of the movement of the rack 26 to the steering operation can be prevented from being unnecessarily deteriorated.

Further, in the target position correction control, the steering controller 15 calculates the correction amount C according to the steering angular acceleration α2. Accordingly, it is possible to calculate an appropriate correction amount C according to a change in the steering angular velocity ω of the steering member 10.

Further, the steering controller 15 calculates the correction amount C such that the correction amount C increases as the steering angular acceleration α2 increases. Thus, the correction amount C increases as the quickness of the steering operation increases, so that the delay in the movement of the rack 26 can also increase. Accordingly, it is possible to surely prevent the front wheels 3 from being rapidly steered immediately after the quick steering operation, so that the discomfort of the driver can be suppressed effectively.

By the way, if the correction amount C increases indefinitely, the delay in the movement of the rack 26 may become excessively large, and it may become impossible to determine whether the delay in the movement of the rack 26 is caused by the target position correction control or an abnormality of the steering system 1. As such, the steering controller 15 limits the correction amount C to the upper limit Lim or less. Thus, it can be easily determined that the steering system 1 is abnormal as soon as the correction amount C exceeds the upper limit Lim. Accordingly, it is unnecessary to require excessively high reliability of the components (sensors, or the like) of the steering system 1.

Further, the steering controller 15 is configured to set the upper limit Lim based on the steering direction Dr, the steering angle θ, and the vehicle speed V. Accordingly, the upper limit Lim can be set to an appropriate value according to the traveling state of the vehicle 2.

Further, the steering controller 15 is configured to switch between the non-execution mode in which the steering controller 15 does not execute the target position correction control and the execution mode in which the steering controller 15 executes the target position correction control. Thus, it is possible to determine whether to execute the target position correction control depending on the preference of the driver, the traveling state of the vehicle 2, or the like. Accordingly, the convenience of the steering system 1 is improved.

Modified Embodiment

In the above embodiment, the correction amount calculating unit 46 calculates the correction amount C by referring to the correction amount calculation map. On the other hand, in another embodiment, the correction amount calculating unit 46 may run a simulation by using a steering model and calculate the correction amount C based on the result of this simulation.

Figure 10:
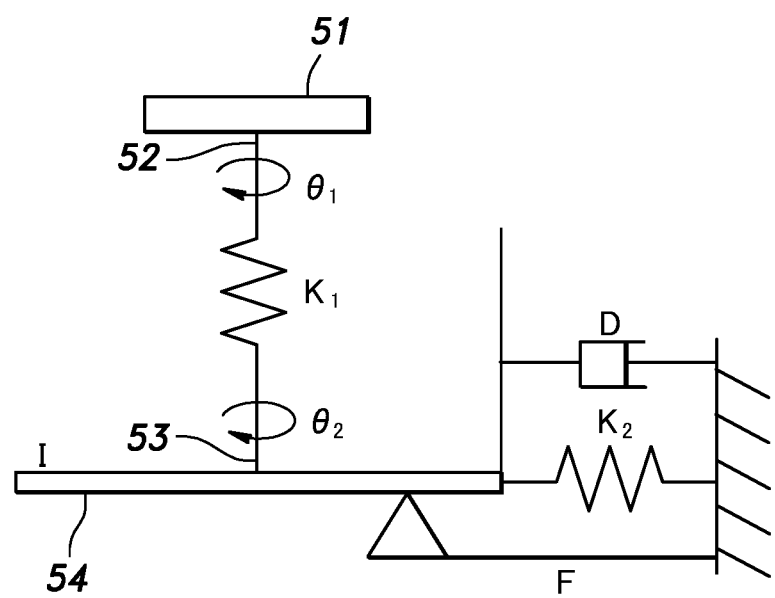

FIG. 10 shows an example of the steering model used in the above simulation. This steering model is set based on Electric Power Steering (EPS). This steering model includes a steering wheel 51, a steering shaft 52 connected to the steering wheel 51, a pinion 53 connected to the steering shaft 52, and a rack 54 engaging with the pinion 53.

In the steering model shown in FIG. 10, the following equation (1) is satisfied.

$$I\ddot{\theta}_2 = -F + D\dot{\theta}_2 + K_1(\theta_1 - \theta_2) + K_2\theta_2 \quad (1)$$

$\theta_1$: angle of the steering shaft 52
$\theta_2$: angle of the pinion 53
I: moment of inertia of the rack 54
F: frictional resistance
D: damping coefficient
$K_1$: equivalent spring constant of the steering shaft 52
$K_2$: equivalent spring constant between the rack 54 and the road surface By using the steering model as described above, the parameters (for example, I, F, D, $K_1$, and $K_2$) of the above equation (1) can be varied according to the shape, size, traveling state, or the like of the vehicle 2, and thus an optimum correction amount C can be determined.

In the above embodiment, the correction amount calculating unit 46 calculates the correction amount C based on the steering angular acceleration α2. On the other hand, in another embodiment, the correction amount calculating unit 46 may calculate the correction amount C based on the steering angular velocity ω, or may calculate the correction amount C based on both the steering angular acceleration α2 and the steering angular velocity ω.

In the above embodiment, the target position correcting unit 48 corrects the target position T1 by adding the correction amount C to the target position T1. On the other hand, in another embodiment, the target position correcting unit 48 may correct the target position T1 by multiplying the target position T1 by a correction ratio.

In the above embodiment, the target position correcting unit 48 corrects the target position T1 immediately after the start of the returning operation. On the other hand, in another embodiment, the target position correcting unit 48 may correct the target position T1 not only immediately after the start of the returning operation but also immediately after the start of the turning operation. Further, in still another embodiment, the target position correcting unit 48 may correct the target position T1 immediately before the end of the returning operation and/or the turning operation. In this way, the target position correcting unit 48 may correct the target position T1 at any timing.

In the above embodiment, the steering controller 15 is configured to switch between the non-execution mode in which the steering controller 15 does not execute the target position correction control in response to the steering operation and the execution mode in which the steering controller 15 executes the target position correction control in response to the steering operation. On the other hand, in another embodiment, the steering controller 15 may be configured to execute the target position correction control in response to every steering operation. Accordingly, since the front wheels 3 can be surely prevented from being rapidly steered immediately after the quick steering operation, so that the discomfort of the driver can be suppressed more surely.

In the above embodiment, the rack position sensor 33 is configured to directly detect the rack position. On the other hand, in another embodiment, the rack position sensor 33 may indirectly detect the rack position based on the turning angle of the front wheels 3 or based on the lateral acceleration applied to the vehicle 2.

Concrete embodiments of the present invention have been described in the foregoing, but the present invention should not be limited by the foregoing embodiments and various modifications and alterations are possible within the scope of the present invention.

REFERENCE SIGNS LIST

1: steering system
2: vehicle
3: front wheels (an example of wheels)
10: steering member
11: steering mechanism
12: steering actuator
15: steering controller (an example of a controller)
32: steering angle sensor
33: rack position sensor

The invention claimed is:

1. A steering system for a vehicle, comprising:
a steering member configured to receive a steering operation;
a steering angle sensor configured to detect a steering angle of the steering member;
a steering mechanism mechanically separated from the steering member and configured to steer wheels by moving a rack;
a steering actuator configured to apply a driving force to the steering mechanism;
a rack position sensor configured to detect a position of the rack; and
a controller configured to calculate a target position of the rack based on the steering angle of the steering member and to control the steering actuator such that the position of the rack detected by the rack position sensor matches the target position of the rack,
wherein the controller is configured to execute target position correction control in which the controller corrects the target position of the rack according to a steering angular velocity and/or a steering angular acceleration of the steering member to delay a movement of the rack in response to a change in the steering angle of the steering member,
wherein the controller is configured to switch between a non-execution mode in which the controller does not execute the target position correction control in response to the steering operation and an execution mode in which the controller executes the target position correction control in response to the steering operation.

2. The steering system for the vehicle according to claim 1, wherein in the target position correction control, the controller corrects the target position of the rack immediately after a start of the steering operation in a prescribed direction.

3. The steering system for the vehicle according to claim 2, wherein the steering operation includes a turning operation as an operation in a direction away from a prescribed neutral position and a returning operation as an operation in a direction of the neutral position, and
in the target position correction control, the controller corrects the target position of the rack immediately after a start of the returning operation.

4. A steering system for a vehicle, comprising:
a steering member configured to receive a steering operation;
a steering angle sensor configured to detect a steering angle of the steering member;
a steering mechanism mechanically separated from the steering member and configured to steer wheels by moving a rack;
a steering actuator configured to apply a driving force to the steering mechanism;
a rack position sensor configured to detect a position of the rack; and
a controller configured to calculate a target position of the rack based on the steering angle of the steering member and to control the steering actuator such that the position of the rack detected by the rack position sensor matches the target position of the rack,
wherein the controller is configured to execute target position correction control in which the controller corrects the target position of the rack according to a steering angular velocity and/or a steering angular acceleration of the steering member to delay a movement of the rack in response to a change in the steering angle of the steering member,
wherein the steering operation includes a turning operation as an operation in a direction away from a prescribed neutral position and a returning operation as an operation in a direction of the neutral position, and
in the target position correction control, the controller corrects the target position of the rack immediately after a start of the returning operation,
wherein in the target position correction control, the controller prohibits correction of the target position of the rack during performance of the turning operation.

5. The steering system for the vehicle according to claim 1, wherein in the target position correction control, the controller calculates the target position of the rack according to the steering angle of the steering member, calculates a correction amount of the target position of the rack according to the steering angular acceleration of the steering member, and corrects the target position of the rack by adding the correction amount to the target position of the rack.

6. A steering system for a vehicle, comprising:
a steering member configured to receive a steering operation;
a steering angle sensor configured to detect a steering angle of the steering member;
a steering mechanism mechanically separated from the steering member and configured to steer wheels by moving a rack;
a steering actuator configured to apply a driving force to the steering mechanism;
a rack position sensor configured to detect a position of the rack; and
a controller configured to calculate a target position of the rack based on the steering angle of the steering member and to control the steering actuator such that the position of the rack detected by the rack position sensor matches the target position of the rack,
wherein the controller is configured to execute target position correction control in which the controller corrects the target position of the rack according to a steering angular acceleration of the steering member to delay a movement of the rack in response to a change in the steering angle of the steering member,
wherein in the target position correction control, the controller calculates the target position of the rack according to the steering angle of the steering member, calculates a correction amount of the target position of the rack according to the steering angular acceleration of the steering member, and corrects the target position of the rack by adding the correction amount to the target position of the rack,
wherein the controller calculates the correction amount such that the correction amount increases as the steering angular acceleration of the steering member increases.

7. The steering system for the vehicle according to claim 6, wherein the controller limits the correction amount to a prescribed upper limit or less.

8. The steering system for the vehicle according to claim 7, wherein the steering member is configured to be steered in a direction away from a prescribed neutral position or in a direction of the neutral position, and
the controller is configured to set the upper limit based on a steering direction of the steering member, the steering angle of the steering member, and a vehicle speed.

9. The steering system for the vehicle according to claim 1, wherein the controller is configured to execute the target position correction control in response to every steering operation.

* * * * *